US009847946B2

(12) United States Patent
Aoki (10) Patent No.: US 9,847,946 B2
(45) Date of Patent: Dec. 19, 2017

(54) SYSTEM AND METHOD FOR GRANULAR NETWORK ACCESS AND ACCOUNTING (71) Applicant: Google Inc., Mountain View, CA (US)

(72) Inventor: Paul Masami Aoki, Los Altos, CA (US)

(73) Assignee: Google, Inc., Mountain View, CA (US)

(*) Notice: Subject to any disclaimer, the term of this patent is extended or adjusted under 35 U.S.C. 154(b) by 49 days.

(21) Appl. No.: 14/701,794

(22) Filed: May 1, 2015

(65) Prior Publication Data

US 2016/0323191 A1    Nov. 3, 2016

(51) Int. Cl.
| | |
|---|---|
| H04L 12/851 | (2013.01) |
| H04L 12/813 | (2013.01) |
| H04L 12/801 | (2013.01) |
| H04L 12/721 | (2013.01) |
| G06Q 30/04 | (2012.01) |
| H04L 12/14 | (2006.01) |
| H04L 12/24 | (2006.01) |
| H04L 12/26 | (2006.01) |

(52) U.S. Cl.
CPC ......... *H04L 47/2408* (2013.01); *G06Q 30/04* (2013.01); *H04L 12/1407* (2013.01); *H04L 41/0893* (2013.01); *H04L 45/12* (2013.01); *H04L 47/14* (2013.01); *H04L 47/20* (2013.01); H04L 12/1417 (2013.01); H04L 12/1435 (2013.01); H04L 12/1467 (2013.01); H04L 12/1496 (2013.01); H04L 43/0876 (2013.01)

(58) Field of Classification Search
CPC .................................................. H04L 47/2408
See application file for complete search history.

(56) References Cited

U.S. PATENT DOCUMENTS

| | | |
|---|---|---|
| 7,908,395 B1 | 3/2011 | Salkewicz |
| 8,539,488 B1 | 9/2013 | Havemose |
| 8,849,979 B1 | 9/2014 | Qureshi |
| 2003/0066031 A1 | 4/2003 | Laane |
| 2006/0143622 A1 | 6/2006 | Prabandham et al. |
| 2007/0011174 A1* | 1/2007 | Takaragi ................ G06F 21/54 |

(Continued)

FOREIGN PATENT DOCUMENTS

WO    2014044689 A1    3/2014

OTHER PUBLICATIONS

International Search Report and Written Opinion dated Jul. 5, 2016, for PCT Application No. PCT/US2016/029152.

*Primary Examiner* — Brian D Nguyen
*Assistant Examiner* — Toan Nguyen
(74) *Attorney, Agent, or Firm* — Lerner, David, Littenberg, Krumholz & Mentlik, LLP (57) ABSTRACT A method and apparatus are provided in which network traffic is separated based on application, query, or other criteria. A first application is stored in a first control group in a resource isolation environment, the first control group being associated with a first policy. A second application is stored in a second control group in the resource isolation environment, the second control group being associated with a second policy. Upon receiving a request for content through one of the first application and the second application, it is determined which control group is associated with the request. Traffic is managed in connection with the request according to the policy associated with the determined control group.

18 Claims, 5 Drawing Sheets (56) References Cited

U.S. PATENT DOCUMENTS

| | | | |
|---|---|---|---|
| 2008/0132201 A1* | 6/2008 | Karlberg | G06Q 20/227 |
| | | | 455/407 |
| 2010/0198698 A1 | 8/2010 | Raleigh et al. | |
| 2011/0154477 A1 | 6/2011 | Parla et al. | |
| 2011/0202646 A1* | 8/2011 | Bhatia | H04L 67/06 |
| | | | 709/223 |
| 2012/0124229 A1* | 5/2012 | Sahu | H04W 76/02 |
| | | | 709/228 |
| 2013/0311660 A1 | 11/2013 | Dabbiere et al. | |
| 2014/0122716 A1* | 5/2014 | Santhiveeran | H04L 63/102 |
| | | | 709/225 |
| 2014/0325644 A1* | 10/2014 | Oberg | G06F 21/51 |
| | | | 726/22 |
| 2016/0134762 A1* | 5/2016 | Bank | H04M 15/7652 |
| | | | 455/406 |

* cited by examiner

SYSTEM AND METHOD FOR GRANULAR NETWORK ACCESS AND ACCOUNTING

BACKGROUND

Mobile Internet users in some markets use prepaid or noncontract mobile service. If these users run into short term personal cash flow issues, it may result in reduced and/or interrupted Internet service. Large prepaid "data bundles" offer volume discounts (per byte) but tie up valuable cash, whereas using pay-as-you-go phone credits for Internet is extremely expensive (per byte).

Some network traffic, for example traffic to/from a specific website, may be subsidized, thereby providing a discount to the user for bytes used to access that specific website. While it may be possible to track the data used to access the specific site, it is more difficult to handle "apps", because the network traffic is not simply to/from a single host or domain. For example, a page load for a news content website may load resources from many different domains, such as the news content provider, the advertising content provider, the user traffic tracking service, etc. Protocols are also evolving, such as the increased use of HTTP/2, or other protocols built directly on top of transmission control protocol (TCP) connections to load app data (such as WebSocket). Forcing app developers to shoehorn their products into network traffic patterns optimized for making network usage tabulation more convenient is undesirable.

SUMMARY

One aspect of the disclosure provides a method of separating network traffic. According to this method, a first application is stored in a first control group in a resource isolation environment, the first control group being associated with a first policy, and a second application is stored in a second control group in the resource isolation environment, the second control group being associated with a second policy. A request for content is received through one of the first application and the second application, and it is determined, with the processor, which control group is associated with the request. Traffic is managed in connection with the request according to the policy associated with the determined control group.

Another aspect of the disclosure provides a system, comprising a resource isolation environment including at least a first control group and a second control group, wherein each control group is associated with at least one policy, and one or more processors in communication with the resource isolation environment, The one or more processors may be configured to store a first application in the first control group in the resource isolation environment, the first control group being associated with a first policy, store a second application in the second control group in the resource isolation environment, the second control group being associated with a second policy, receive a request for content through one of the first application and the second application, determine which control group is associated with the request, and manage traffic in connection with the request according to the policy associated with the determined control group.

Yet another aspect of the disclosure provides a non-transitory computer-readable medium storing instructions executable by a processor for performing a method of separating network traffic. This method includes storing a first application in a first control group in a resource isolation environment, the first control group being associated with a first policy, storing a second application in a second control group in the resource isolation environment, the second control group being associated with a second policy, receiving a request for content through one of the first application and the second application, determining which control group is associated with the request, and managing traffic in connection with the request according to the policy associated with the determined control group.

DETAILED DESCRIPTION

Overview

The present disclosure provides a mechanism for separating out network traffic for one or more selected apps for accounting purposes in a way that is transparent to the selected apps and is not protocol specific. Moreover, this proposed mechanism combines all of an app's traffic irrespective of traffic type, is difficult to circumvent, does not require extensive client configuration or operator infrastructure, and does not consume excessive resources.

Operating systems of mobile devices may include Linux containers or other resource isolation environments. Such resource isolation mechanisms enable a control group of one or more user applications to be run inside a resource isolation environment. For example, a mobile app or web browser may be run inside the Linux container. The resource isolation environment presents a standard interface to the control group through which all network traffic is tunneled. The traffic for a first control group is at least partially, if not fully, isolated from traffic for other control groups, for example, based on network access and billing policies. For example, applications in a first control group may be limited to a predetermined amount of data usage, while applications in a second control group have a higher allotment of data usage. Further, applications in a third group may be limited to use on a specific network.

The interface presented by the resource isolation environment may pass the network traffic to any of a variety of devices for further processing. For example, the traffic could be routed to a remote proxy server that provides compression and caching. In another example, the traffic could be tunneled through a remote accounting service using tunnel protocols, virtual private network (VPN) protocols, or other protocols. In another example, the network traffic may be counted by a local accounting service, such as an on-device service. The service may report the network usage by the apps in the control group to an operator, while limiting the network access if the collective usage of the applications in the control group exceeds an amount paid for by the user.

Multiple containers or other resource isolation environments can run on one mobile device or other devices with limited hardware. Apps running within one control group can communicate with apps running in another control group, for example via local inter-process communication or via local network connections.

Resource isolation environments, such as Linux containers, may also be used to separate network traffic by query. For example, a device can have copies of its web browsing client stack running in separate control groups, each control group involving separate network access or accounting policies. For example, a first control group may involve normally priced Internet usage, while a second control group involves Internet usage for one or more websites, wherein such Internet usage is subsidized by an owner of the one or more websites. A browser interface may run in the first control group. As such, when the browser receives a request to visit a given website, the request is loaded and rendered in the first control group. However, if the browser receives a request to visit the one or more websites for which Internet usage is subsidized, the browser may forward the request to the copy of the browsing client in the second control group. Accordingly, the requested web page may be loaded to the second control group with all content being charged according to the subsidized policy.

Example Systems

Figure 1:
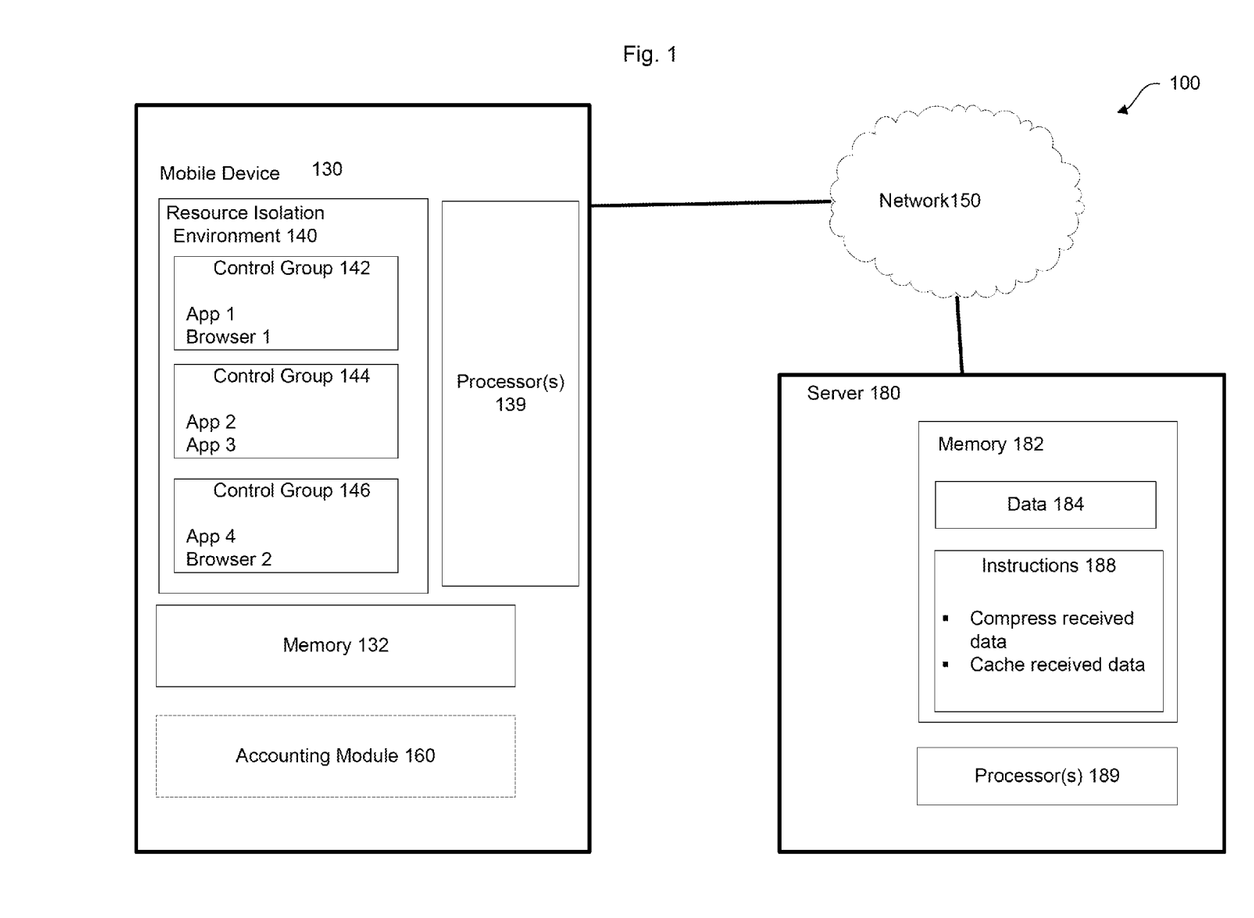
FIG. 1 is an example system according to aspects of the disclosure.

FIG. 1 illustrates an example system 100, in which network access by a mobile device is separated. Such separation enables different policies, such as accounting policies, to be applied to different types of traffic. As shown, mobile device 130 and server 180 are communicatively coupled through network 150.

The network 150, and intervening nodes, may comprise various configurations and protocols including the Internet, World Wide Web, intranets, virtual private networks, wide area networks, local networks, private networks using communication protocols proprietary to one or more companies, Ethernet, Wi-Fi (such as 802.11, 802.11b, g, n, or other such standards), and HTTP, and various combinations of the foregoing.

The mobile device 130 may comprise any mobile computing devices capable of wirelessly exchanging over a network such as the Internet. By way of example only, the mobile device 130 may be a mobile phone or a device such as a wireless-enabled PDA, a tablet PC, or a netbook that is capable of obtaining information via the Internet. In another example, the mobile device 130 may be a head-mounted computing system. The user may input information using a small keyboard, a keypad, microphone, using visual signals with a camera, or a touch screen.

Figure 2:
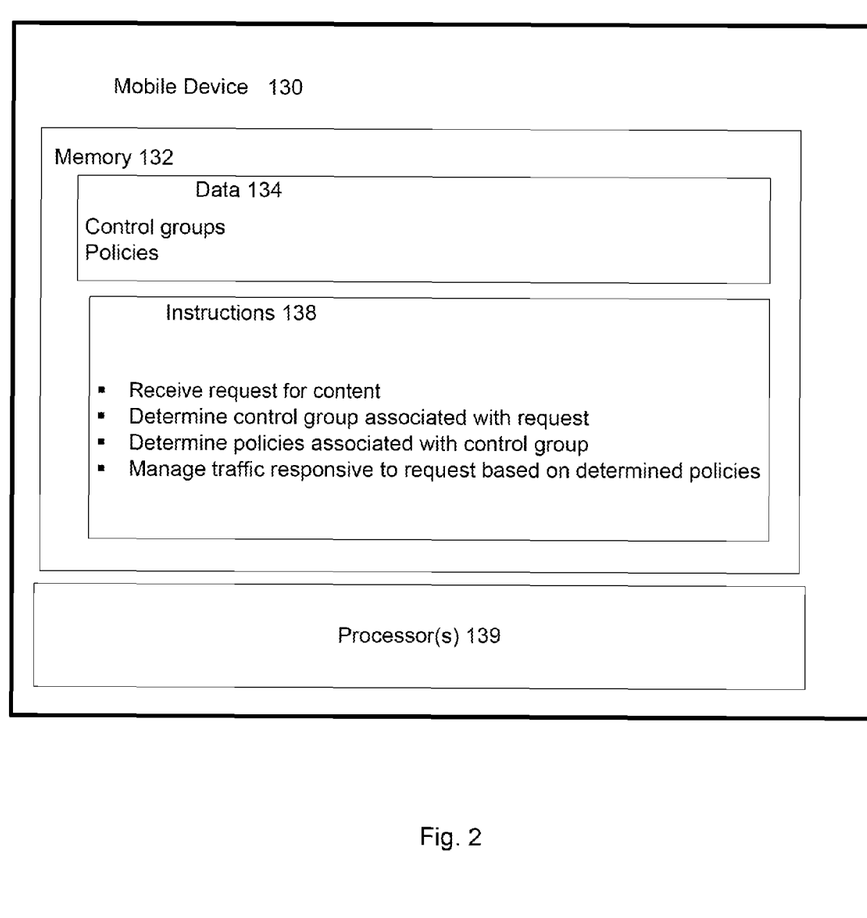
FIG. 2 is a block diagram of components of the system of FIG. 1 according to aspects of the disclosure.

The mobile device 130 may include one or more processors 139 and memory 132, described further in connection with FIG. 2. In one example, the mobile device 130 may be a personal computing device having all of the components normally used in connection with a personal computing device, such as a central processing unit (CPU), memory (e.g., RAM and internal hard drives) storing data and instructions, a display (e.g., a monitor having a screen, a touch-screen, a projector, a television, or other device that is operable to display information), user input device (e.g., a mouse, keyboard, touch-screen or microphone), and all of the components used for connecting these elements to one another.

The mobile device 130 may further include a resource isolation environment 140. These policies will typically be implemented by policy logic executing in the context of the operating system 130 and not implemented directly by the resource isolation environment 140. However, the resource isolation environment 140 provides a means of enforcing that the policy logic is applied to applications in the control group. For example, an operating system run on the mobile device 130 may include a resource isolation mechanism, such as Linux Container (LXC), including one or more control groups 142, 144, 146, such as LXC c-groups. Each of the one or more control groups 142-146 may run one or more user applications, such as mobile "apps" or web browsers. For example, as shown in FIG. 1, control group 142 includes App 1 and Browser 1; control group 144 includes App 2 and App 3; and control group 146 includes App 4 and Browser 2. While two applications are shown in each control group in this example, it should be understood that any number of applications may be included in any given group, and any number of control groups may be included in the resource isolation environment 140. The resources isolation environment 140 may provide a standard network interface to each control group 142-146, such that all application network traffic can be tunneled through that interface. A given control group's network traffic is at least partially isolated from other control group's network traffic.

Each control group 142-146 may be associated with one or more policies, for example, for handling data usage. For example, the policy associated with a given control group may limit an amount of data used by applications in that group in a given time period, such as limiting network traffic for one or more apps to 2 GB per month. As another example, the policy may restrict usage of applications in a control group to particular times or network connections. As an even further example, data usage by applications in the first control group 142 may be billed at a different rate than applications in the second control group 144. While these examples are illustrative, it should be understood that any type of policy may be associated with a particular control group. Moreover, different types of policies may be associated with different control groups. For example, the first control group 142 may be associated with a data usage policy, while the second control group 144 is associated with a privacy policy, and the third control group 146 is associated with a power conservation policy.

Assignment of applications to particular control groups, and associating policies with such groups, may be performed by the user, mobile device manufacturer, or network service provider. For example, the user may assign applications to a particular control group through an input on the mobile device.

According to one example, the mobile device 130 may further include an accounting module 160. The accounting module 160, in communication with the one or more processors 139, may compute a cost associated with one or more control groups. For example, the first control group 142 may be associated with a given monetary limit. The accounting module 160 may compute the cost of data usage in the first control group 142 in a given time period and determine when the monetary limit has been reached. The accounting module 160 may provide an indication to the one or more processors 129 and/or the user that the limit has been reached, and in response further data usage for applications in the first control group 142 may be limited for the duration of the given time period. In some examples, the accounting module may communicate with a network provider through the network 150 to provide computations for billing purposes. In other examples, the accounting module 160 may reside on a network provider server.

The server 180 may be any type of computing device or system of computing devices capable of communicating over a network. Server 110 can contain one or more processors 189, memory 182 and other components typically present in general purpose computing devices. The memory 182 can store information accessible by the one or more processors 189, including instructions 188 that can be executed by the one or more processors 189.

In one example the server 180 may be a proxy server, for example, associated with a network provider. Accordingly, the server 180 may perform operations such as compressing and caching received data. In other examples the server may be an application server, or any other type of server.

Memory 182 can also include data 184 that can be retrieved, manipulated or stored by the processor 189. The memory can be of any non-transitory type capable of storing information accessible by the processor, such as a hard-drive, memory card, ROM, RAM, DVD, CD-ROM, write-capable, and read-only memories.

The instructions 188 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 184 can be retrieved, stored or modified by the one or more processors 189 in accordance with the instructions 188. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 189 can be any conventional processors, such as a commercially available CPU. Alternatively, the processors can be dedicated components such as an application specific integrated circuit ("ASIC") or other hardware-based processor. Although not necessary, the server 180 may include specialized hardware components to perform specific computing processes, such as compressing data, caching data, or performing any other process.

Although FIG. 1 functionally illustrates the processor, memory, and other elements of server 180 as being within the same block, the processor, computer, computing device, or memory can actually comprise multiple processors, computers, computing devices, or memories that may or may not be stored within the same physical housing. For example, the memory can be a hard drive or other storage media located in housings different from that of the server 180. Accordingly, references to a processor, computer, computing device, or memory will be understood to include references to a collection of processors, computers, computing devices, or memories that may or may not operate in parallel. For example, the server 180 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Although only one server 180 is depicted in FIG. 1, it should be appreciated that a typical system can include a large number of connected computing devices, with each different computing device being at a different node of the network 150. For example, the server 180 may be connected to a plurality of client computing devices through the network 150 or through another network (not shown). The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

FIG. 2 provides a block diagram of particular components of the mobile device 130. The mobile device 130 includes a memory 132 and one or more processors 139 in communication with the memory 132. Memory 132 stores information accessible by processor 139, including instructions 138 that may be executed by the processor 139. The memory also includes data 134 that may be retrieved, manipulated or stored by the processor. The memory may be of any type capable of storing information accessible by the processor, such as a hard-drive, memory card, ROM, RAM, DVD, CD-ROM, write-capable, and read-only memories.

The processor 139 may be any conventional processor, such as a commercially available central processing unit ("CPU") or a graphics processing unit ("GPU"). Alternatively, the processor may be a dedicated component such as an application-specific integrated circuit ("ASIC"), a field programmable gate array ("FPGA"), or other hardware-based processor. As another example, the processor 139 may be a quantum computer.

The memory 132 includes data 134 that may be retrieved, manipulated or stored by the processor in accordance with the instructions 138. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data 134 may comprise any information sufficient to identify the relevant information, such as numbers, descriptive text, proprietary codes, pointers, references to data stored in other memories (including other network locations) or information that is used by a function to calculate the relevant data.

The instructions 138 may be any set of instructions to be executed directly (such as machine code) or indirectly (such as scripts) by the processor(s) 139. In that regard, the terms "instructions," "steps" and "programs" may be used interchangeably herein. The instructions may be stored in object code format for direct processing by the processor, or in any other computer language including scripts or collections of independent mobile device code modules that are interpreted on demand or compiled in advance.

The instructions 138 may be executed by the processor, for example, to handle traffic in a predetermined manner based on a particular request or a particular application through which a request is received. For example, the data 134 may include one or more control groups, and one or more policies associated with each control group. The instructions 138 may provide for receiving a request for content, determining which control group is associated with the request, determining which policies are associated with the control group, and managing traffic responsive to the received request based on the policies. For example, a user may desire to access a particular social networking site using an app downloaded to the user's mobile device. If the mobile device 130 is only connected to a given data carrier at that time, the request will incur data usage. The mobile device 130 may determine that the social networking site app is classified in a first control group, and that applications in the first control group are limited to 20 MB per week. If the user has only used 10 MB for applications in the first control group that week, the mobile device may serve the request. However, if it is determined that the user is near or above the 20 MB limit for the week, the mobile device may, for example, provide the user with an alert, limit access to the social networking site such as by restricting playing of videos or music, or prevent the request for content from reaching the social networking site.

The determinations, accounting, and traffic management performed by the mobile device 130 may all be transparent to the user. The user may simply see the applications and other utilities present on the mobile device 130, and may access them without any added hassle or interference.

Although FIG. 2 functionally illustrates the processor 139 and memory 132 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 139. Similarly, the processor 139 may actually comprise a collection of processors which may or may not operate in parallel. In some examples, the memory 132 and/or the one or more processors 139 may be part of a hypervisor.

Figure 3:
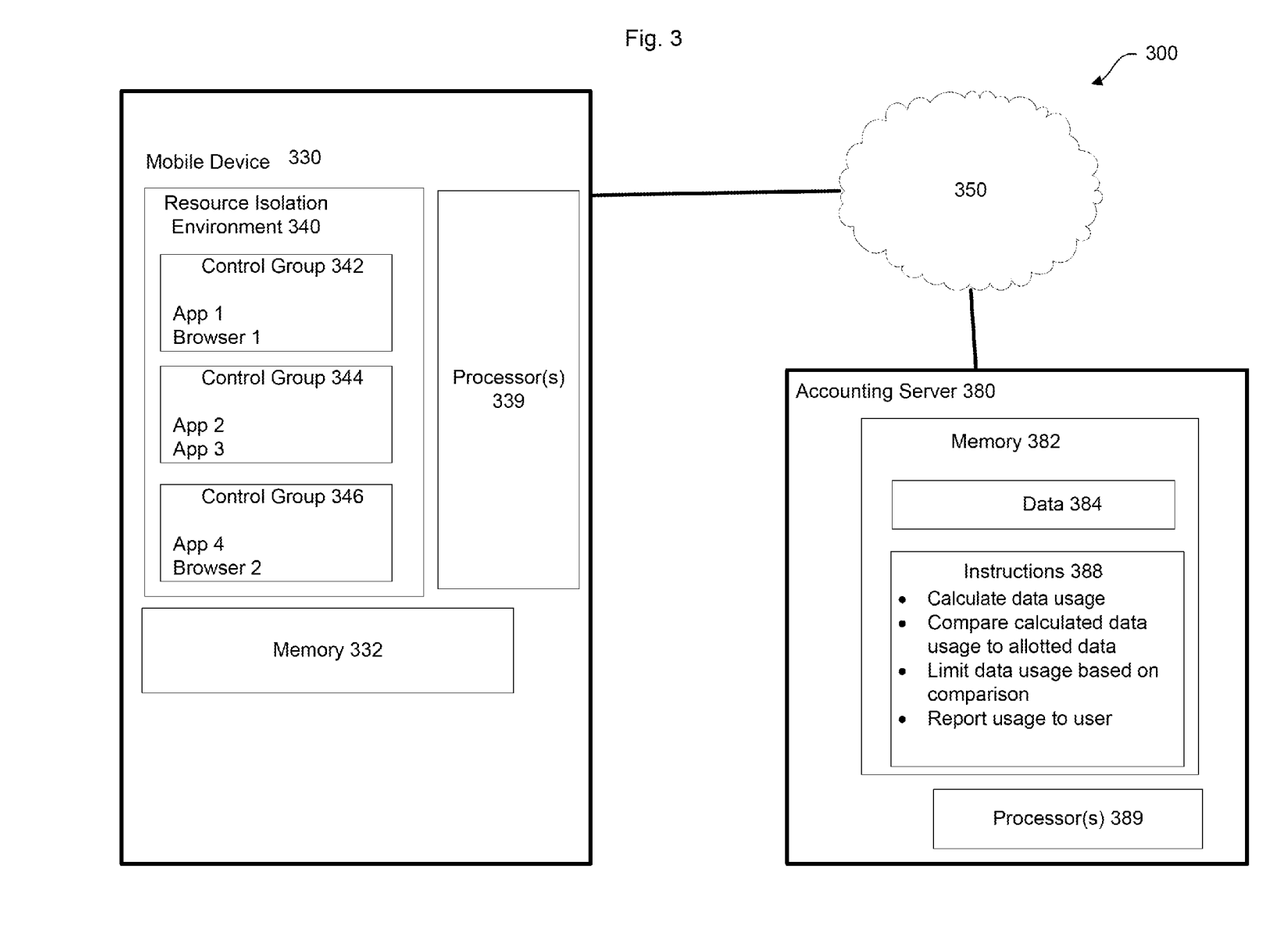
FIG. 3 is another example system according to aspects of the disclosure.

FIG. 3 illustrates another example system 300. In this example, mobile device 330 communicates with an accounting server 380 through network 350. For example, traffic from the mobile device 330 can be tunneled through the accounting server 380 using tunnel protocols, such as generic routing encapsulation (GRE), or VPN protocols.

The mobile device 330 may be similar to the mobile device 130 of FIG. 1, without the accounting module 160. The accounting server 380 may be associated with or independent of a network provider for the mobile device 330. The accounting server may include memory 382 in communication with one or more processors 389 for calculating costs and/or data usage on a per-application or per-request basis. For example, the memory 382 may include data 384 and instructions 388. The instructions 388 may account for data usage differently based on a control group 342-346 associated with the data. For example, the instructions may tabulate data used for applications in a given control group, and calculate a cost for such data usage based on a rate associated with the control group. The rate for one control group may differ from the rate associated with another. In this regard, some applications or data usage may be more expensive than others. The more expensive applications or data usage can be more limited. For example, a user may pre-pay for 100 MB of less expensive data in a first control group, and may pre-pay for 50 MB of more expensive data in a second control group. The instructions 388 may also limit data usage when an allotted amount of data for the control group has been reached. Alternatively or additionally, the instructions 388 may provide for notifying the user of the amount of data used for the control group in comparison to the allotted amount.

Multiple resource isolation environments can run on limited hardware because only specific resources and namespaces are unshared at the operating system level, even though control groups are isolated. Applications running within one control group can communicate with applications running in another control group via local inter-process communication, such as local sockets, or via local network connections, such as a loopback network interface. Accordingly, while the foregoing examples describe separating traffic by application, in other examples traffic may be separated by query.

Figure 4:
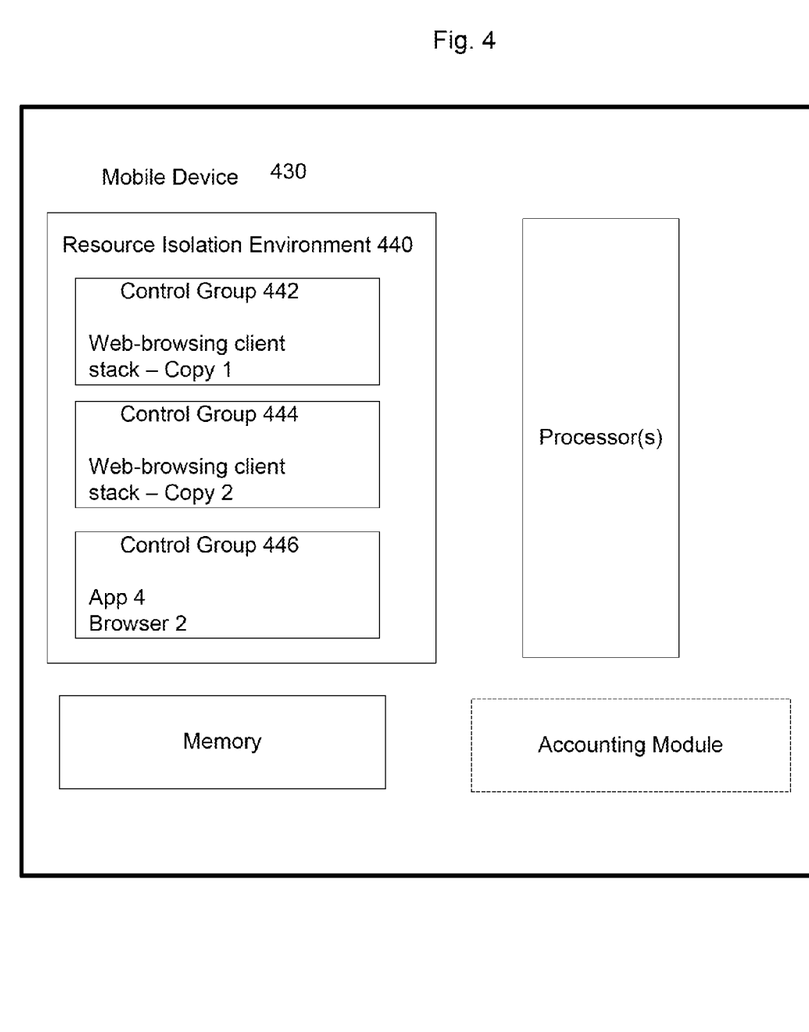
FIG. 4 is a block diagram of another example system according to aspects of the disclosure.

FIG. 4 illustrates such an example where traffic may be separated by query. In this example, mobile device 430 includes resource isolation environment 440, including control groups 442, 444, and 446. Control group 442 may include a first copy of a web-browsing client stack, while control group 444 includes a second copy of the web-browsing client stack. The first control group 442 may be associated with different network access or accounting policies than the second control group 444. The browser user interface may run in the first control group 442, which, for example, may be associated with a normally priced Internet policy. Some websites, however, may subsidize Internet costs. According to this example, a request to the site that subsidizes Internet cost would be forwarded by standard browser proxy to the second copy of the browsing client stack in the second control group 444, which is associated with a subsidized Internet policy. A list of the subsidized sites may be managed remotely, for example, as a device configuration option. When the request is served and a page load is completed, all content is charged according to the subsidized policy associated with the second control group 444. The results may be sent back to be rendered by the browser user interface. A request for content on a website that does not subsidize Internet would be loaded and rendered in the first control group 442 that handles the browser user interface.

Using the techniques of FIG. 4, as opposed to operator network analysis mechanisms, rules can be easily changed without understanding how to configure all network middleboxes used by any network operator. Further, unlike an application-level or proxy approach, the techniques of FIG. 4 do not require explicit rules specifying which prerequisite content is subsidized or not. Rather, it may be assumed that prerequisite content required for the requested page to load is meant to be accounted for in that way. Potential abuse of this assumption can be mitigated, for example, using a browser that validates its inputs during load. For example, the browser can discriminate between a valid image file (that should be subsidized) from a large zip file posing as an image file (that should not be subsidized) using file headers.

Example Methods

Figure 5:
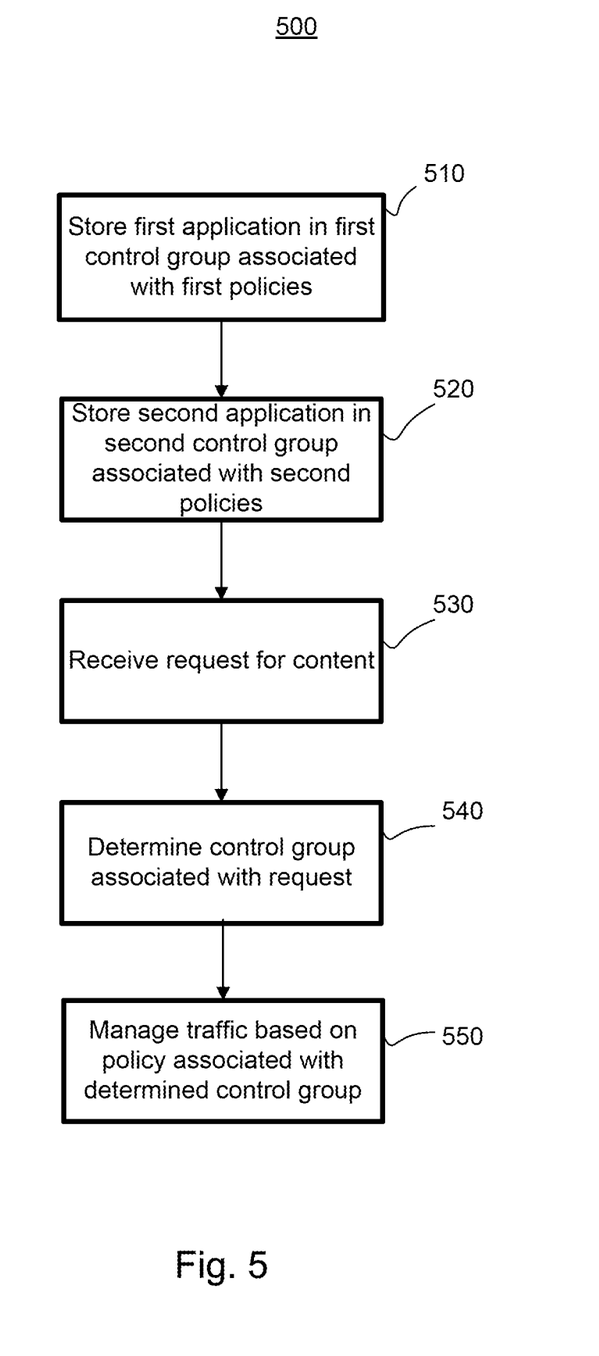
FIG. 5 is a flow diagram of an example method according to aspects of the disclosure.

FIG. 5 provides an example flow diagram illustrating a method 500 for separating network traffic. Operations involved in the method 500 may be handled in a different order or simultaneously, and operations may be added or omitted.

In block 510, a first application is stored in a first control group which is associated with one or more first policies. The control group may be one of a plurality of control groups at an operating system level of a mobile device. The application may be any computer program designed to run on a mobile device, such as a browser, games, etc.

In block 520, a second application is stored in a second control group associated with one or more second policies, such as accounting or network access policies. The first application in the first control group may be fully or partially isolated from the second application in the second control group.

In block 530, a request for content is received from a user. For example, the user may access one of the first and second applications to download a video, access a webpage, play a game, or the like. To the user, the first and second applications may appear in any way the user desires on the mobile device, without accessing particular folders or other areas to reach one of the control groups. The first and second control groups may be completely transparent to the user.

In block 540, it is determined which control group is associated with the request. For example, one or more processors of the mobile device may determine which control group includes the application through which the request was made. In other examples, the one or more processors may determine based on the particular content requested, such as a particular website, which control group is associated with the request.

In block 550, traffic is managed based on the one or more policies associated with the determined control group. Examples of managing traffic may include calculating how much data is used, calculating a cost associated with the used data, determining whether the used data is near or exceeds an allotted amount, restricting access to the requested content, providing alerts to the user, or any of a number of other techniques or a combination thereof.

While the examples above describe separating network traffic for accounting purposes, it should be understood that the network traffic may be separated for any other purpose. For example, the network traffic may be separated to enable application of different privacy policies, power consumption/conservation policies, or any other type of policy. Moreover, while the foregoing examples describe separating network traffic based on application or query, it should be understood that the techniques described herein may be used to separate network traffic based on any of a number of other criteria.

The foregoing techniques are advantageous in that they provide for an inexpensive implementation on the user device which can be easily upgraded. The network traffic may be tabulated automatically without specialized code that must be maintained whenever protocols or uniform resource locators (URLs) change. Moreover, unlike an operating system level tunnel approach, only the control groups' own virtual interfaces are visible to the control groups' members. The kernel-based isolated namespaces provided by the resource isolation environment eliminates a need for matching applications to tunnel interfaces and for enforcing access policies in a way that is not easily circumvented.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method of separating network traffic, comprising:
   storing a first application in a first control group in a resource isolation environment, the first control group being associated with a first policy, the first policy setting constraints with respect to at least one of data usage, network connection times, networks used for connection, privacy, or power consumption;
   storing a copy of the first application in a second control group in the resource isolation environment for serving queries through the copy of the first application separately from queries served through the first application in the first control group, the second control group being associated with a second policy different than the first policy, the second policy setting constraints with respect to at least one of data usage, network connection times, networks used for connection, privacy, or power consumption;
   receiving, with one or more processors, a first query through the first application, the first query including a first request for content;
   determining, with the processor, that the content requested by the first query is designated to be controlled by the first policy associated with the first control group;
   serving, with the processor, the first query according to the constraints of the first policy;
   receiving, with the processor, a second query through the first application, the second query including a second request for content;
   determining, with the processor, that the content requested by the second query is designated to be controlled by the second policy associated with the second control group;
   forwarding the second request for content to the copy of the first application in the second control group; and
   serving, with the processor, the second query according to the constraints of the second policy.

2. The method of claim 1, wherein the first application is a browsing client stack.

3. The method of claim 1, wherein the first policy is one of a network access policy and an accounting policy.

4. The method of claim 3, wherein serving the first query comprises calculating a cost associated with loading the content requested by the first request.

5. The method of claim 1, wherein the resource isolation environment comprises a Linux container.

6. The method of claim 1, wherein serving the first query comprises:
   determining an amount of data used for applications in the first control group in a given amount of time; and
   comparing the determined amount of data used to an allotted amount of data.

7. The method of claim 6, further comprising limiting subsequent data usage for applications in the first control group based on the comparing.

8. The method of claim 1, wherein serving the first query comprises tunneling traffic through a remote accounting server.

9. A system, comprising:
   a resource isolation environment including at least a first control group and a second control group, wherein each control group is associated with at least one policy;
   one or more processors in communication with the resource isolation environment, the one or more processors configured to:
   store a first application in the first control group in the resource isolation environment, the first control group being associated with a first policy, the first policy setting constraints with respect to at least one of data usage, network connection times, networks used for connection, privacy, or power consumption;

store a copy of the first application in the second control group in the resource isolation environment for serving queries through the copy of the first application separately from queries served through the first application in the first control group, the second control group being associated with a second policy different than the first policy, the second policy setting constraints with respect to at least one of data usage, network connection times, networks used for connection, privacy, or power consumption;

receive a first query through the first application, the first query including a first request for content;

determine that the content requested by the first query is designated to be controlled by the first policy associated with the first control group; and serve the first query according to the constraints of the first policy;

receive a second query through the first application, the second query including a second request for content;

determine that the content requested by the second query is designated to be controlled by the second policy associated with the second control group; and serve the second query according to the constraints of the second policy.

10. The system of claim 9, further comprising an accounting module programmed to perform calculations in connection with data usage for each control group.

11. The system of claim 10, wherein the resource isolation environment, one or more processors, and accounting module reside on a mobile device.

12. The system of claim 9, wherein the first application is a browsing client stack.

13. The system of claim 9, wherein the first policy is one of a network access policy and an accounting policy.

14. The system of claim 13, wherein serving the first query comprises calculating a cost associated with loading the content requested by the first request.

15. The system of claim 9, wherein the resource isolation environment comprises a Linux container.

16. The system of claim 9, wherein serving the first query comprises:

determining an amount of data used for applications in the first control group in a given amount of time; and comparing the determined amount of data used to an allotted amount of data.

17. The system of claim 16, wherein the one or more processors are further configured to limit subsequent data usage for applications in the first control group based on the comparing.

18. A non-transitory computer-readable medium storing instructions executable by a processor for performing a method of separating network traffic, the method comprising:

storing a first application in a first control group in a resource isolation environment, the first control group being associated with a first policy, the first policy setting constraints with respect to at least one of data usage, network connection times, networks used for connection, privacy, or power consumption;

storing a copy of the first application in a second control group in the resource isolation environment for serving queries through the copy of the first application separately from queries served through the first application in the first control group, the second control group being associated with a second policy different than the first policy, the second policy setting constraints with respect to at least one of data usage, network connection times, networks used for connection, privacy, or power consumption;

receiving a first query through the first application, the first query including a first request for content;

determining that the content requested by the first query is designated to be controlled by the first policy associated with the first control group; and serving the first query according to the constraints of the first policy, receiving a second query through the first application, the second query including a second request for content;

determining that the content requested by the second query is designated to be controlled by the second policy associated with the second control group;

forwarding the second request for content to the copy of the first application in the second control group; and serving the second query according to the constraints of the second policy.

* * * * *